Nov. 9, 1937.  W. R. SMITH  2,098,260
FILLED CAN WEIGHING AND SORTING APPARATUS
Filed Dec. 27, 1933   5 Sheets-Sheet 1
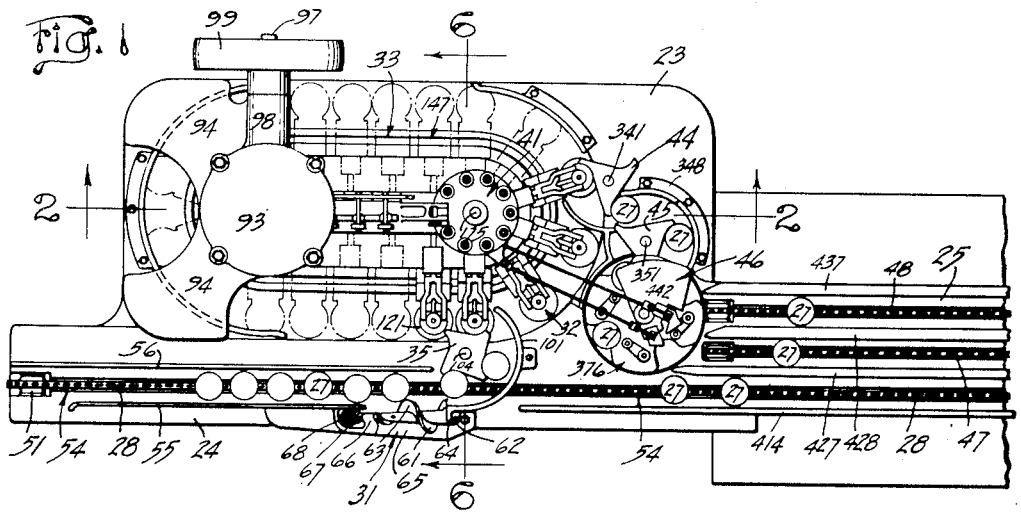
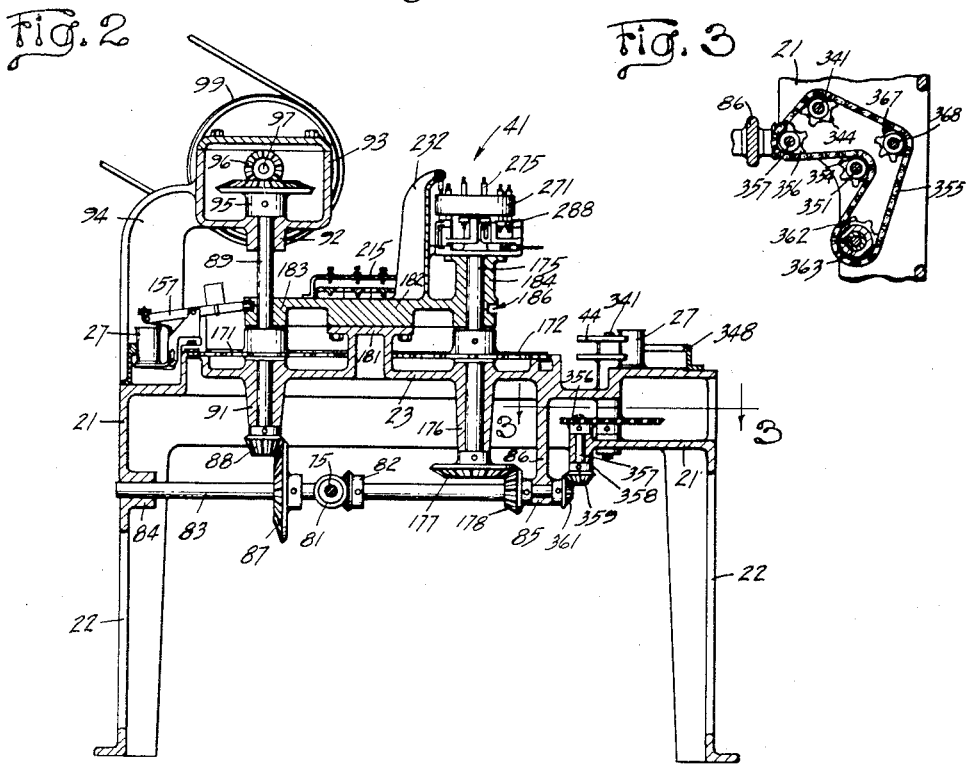
INVENTOR
William Ross Smith
BY Ivan D. Thornburgh
Charles H. Cook
ATTORNEYS Nov. 9, 1937.  W. R. SMITH  2,098,260
FILLED CAN WEIGHING AND SORTING APPARATUS
Filed Dec. 27, 1933  5 Sheets—Sheet 2
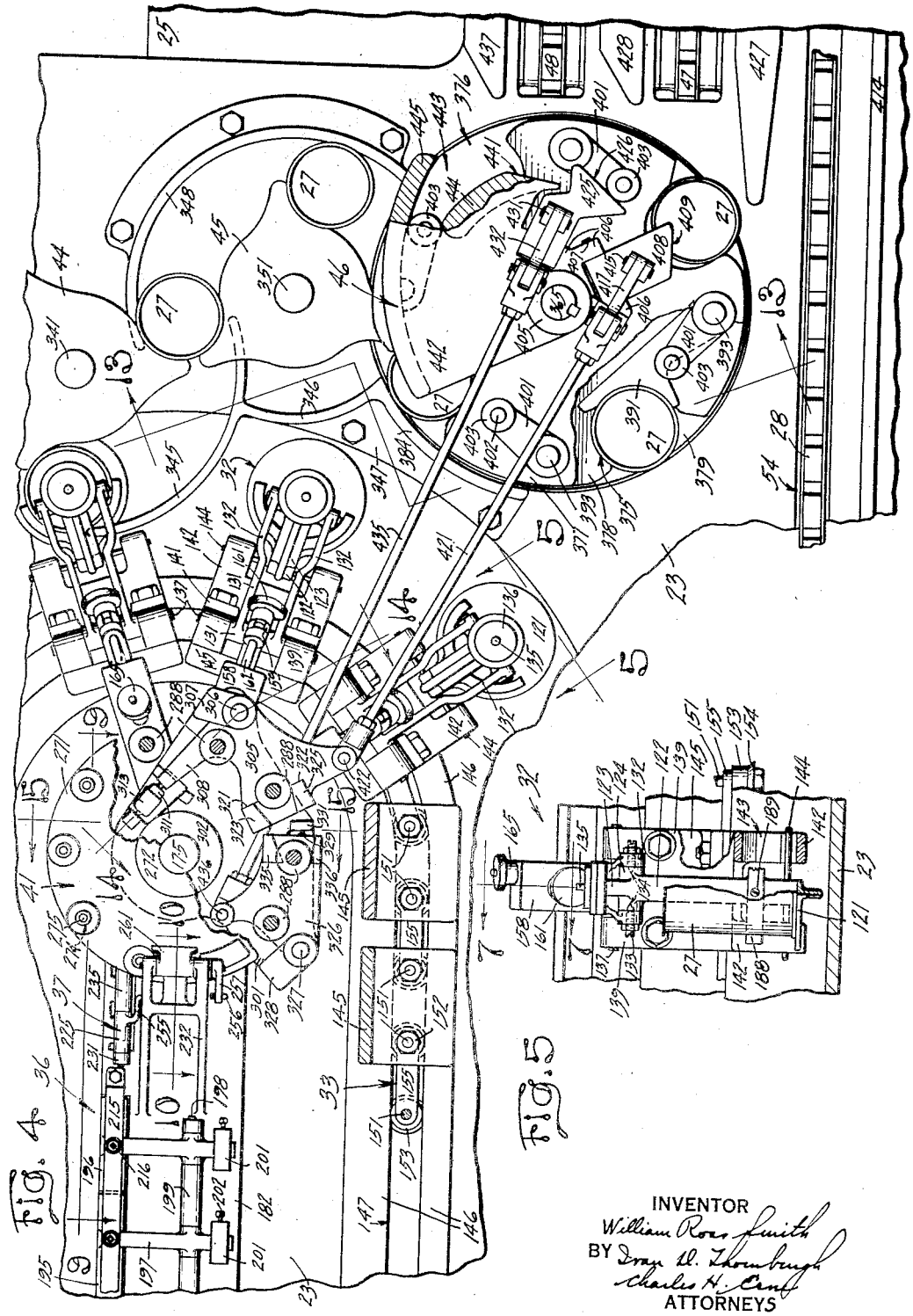
INVENTOR
William Roar Smith
BY
ATTORNEYS

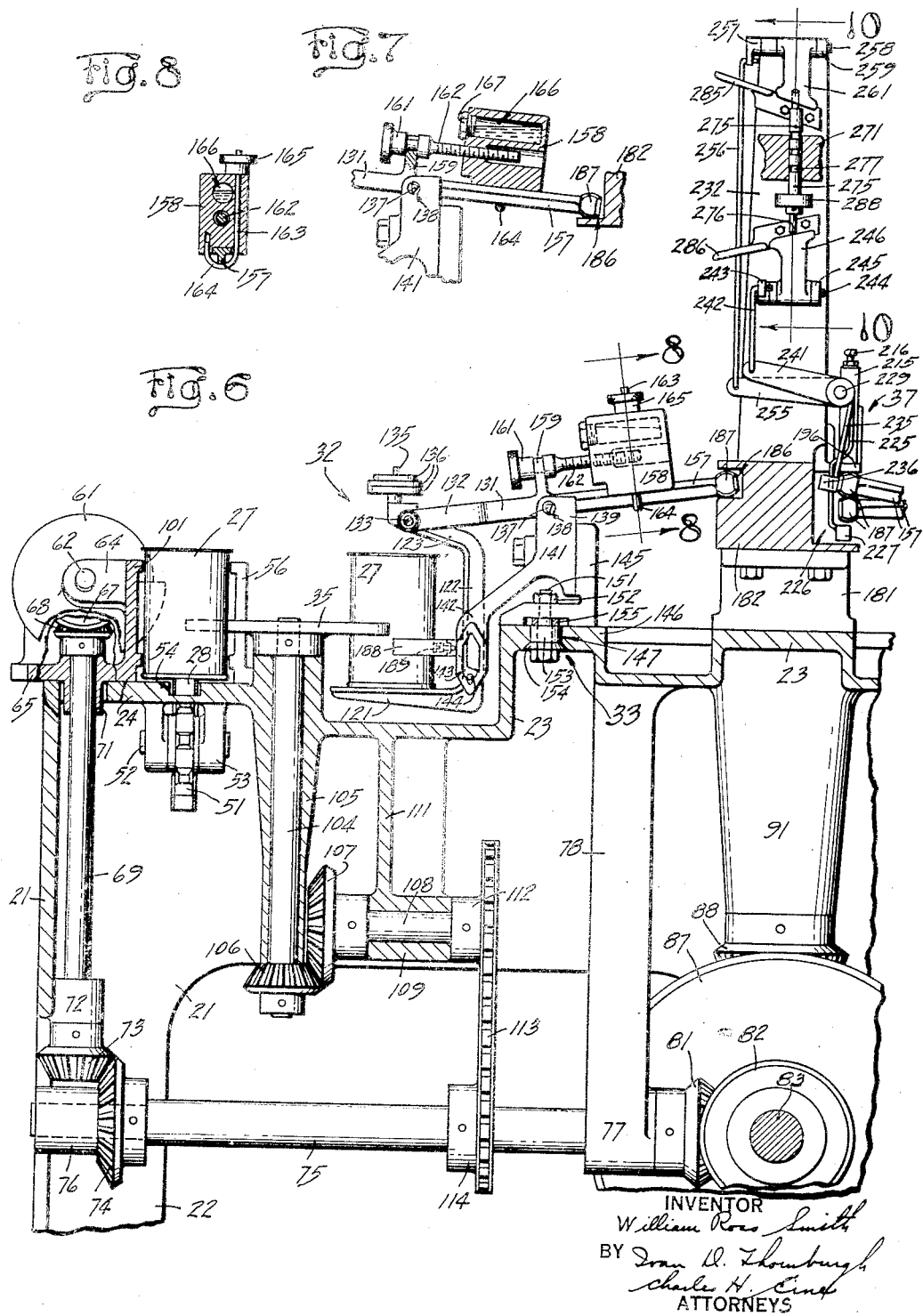

Nov. 9, 1937.　　　　　W. R. SMITH　　　2,098,260
FILLED CAN WEIGHING AND SORTING APPARATUS
Filed Dec. 27, 1933　　　5 Sheets-Sheet 4
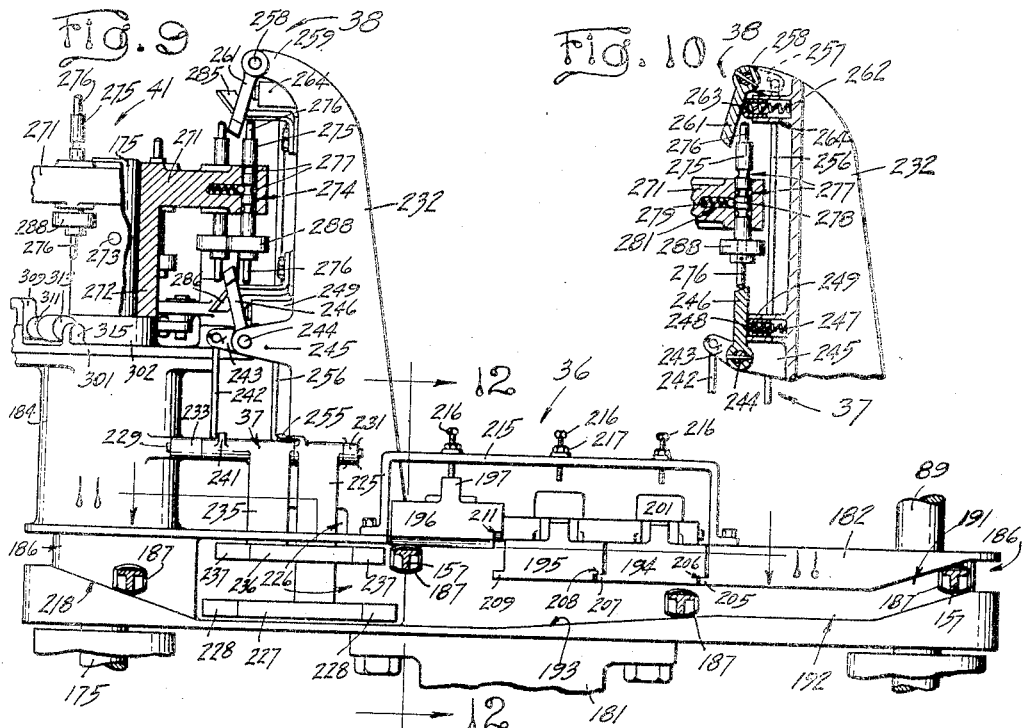
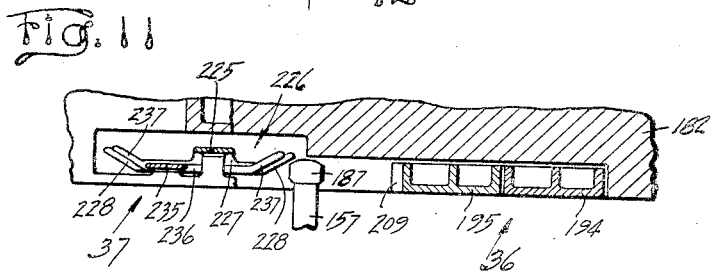
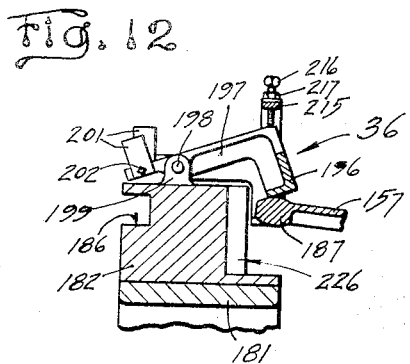
INVENTOR
William Roay Smith
BY
ATTORNEYS Nov. 9, 1937.                    W. R. SMITH                    2,098,260
                    FILLED CAN WEIGHING AND SORTING APPARATUS
                    Filed Dec. 27, 1933              5 Sheets-Sheet 5
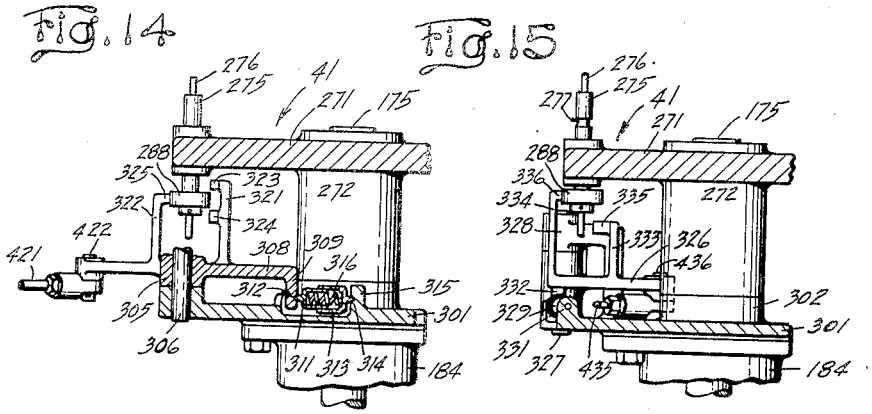
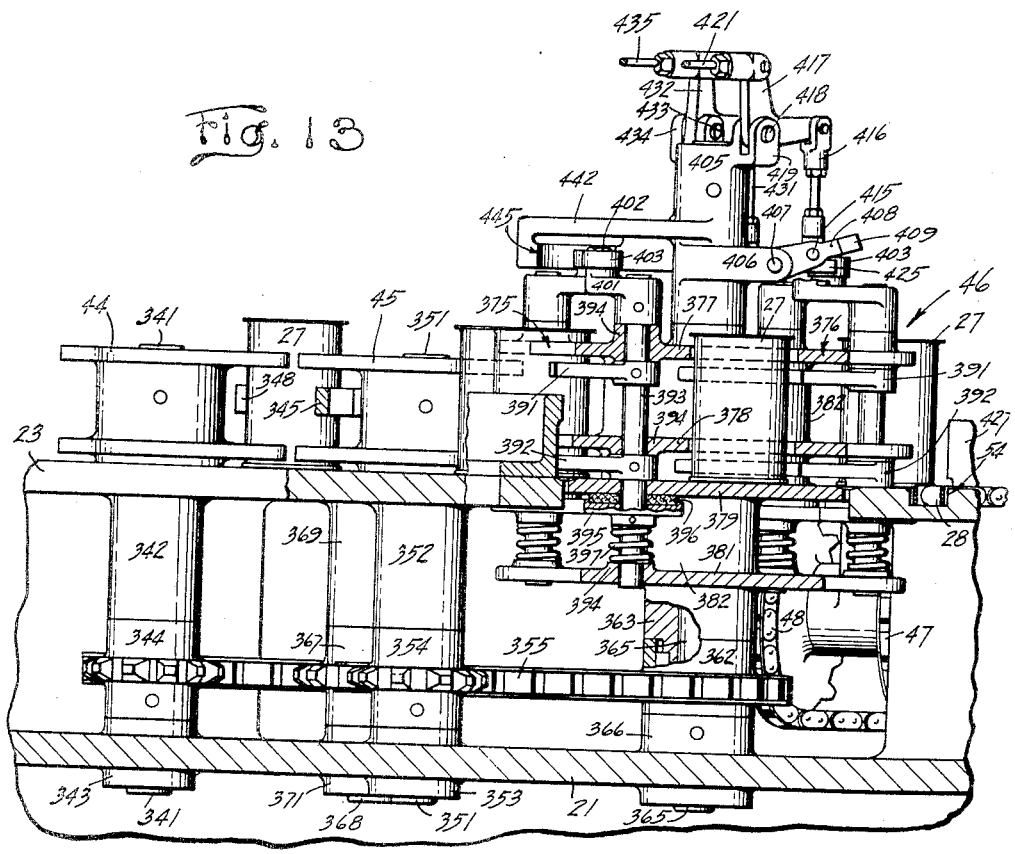
INVENTOR
William Ross Smith
BY
ATTORNEYS Patented Nov. 9, 1937

2,098,260

UNITED STATES PATENT OFFICE 2,098,260

FILLED CAN WEIGHING AND SORTING APPARATUS

William Ross Smith, Portland, Oreg., assignor to American Can Company, New York, N. Y., a corporation of New Jersey Application December 27, 1933, Serial No. 704,194

19 Claims. (Cl. 209—121)

The present invention relates to weighing and sorting machines and has particular reference to the weighing and sorting of filled open top cans while conveying them continuously and without spilling, the cans after weighing being automatically sorted and segregated, in accordance with a predetermined weight range, into different discharge lanes of a discharge table.

In the canning of many products a relatively uniform weight in individual cans is highly desirable and for filled cans containing liquids such as the small fruits (strawberries, raspberries, etc., packed in syrup) extreme care is required in handling these open top filled cans during the weighing and sorting so as to avoid spilling.

The present invention contemplates the rapid weighing and sorting of this difficult kind as well as other kinds of filled cans, the machine embodying the invention being designed and operated to continuously and evenly function with a minimum of abrupt or irregular movements or change of movements to the end that the cans being weighed will not be spilled yet will be accurately separated into their respective weight ranges in an expeditious manner.

Furthermore, the invention contemplates in its preferred embodiment the bringing of the cans after weighing into convenient positions, segregated into normal, light and heavy weight ranges so that more of the product can be placed into those of insufficient weight or some of the product can be removed from those cans containing more than the desired amount of product.

In many canneries it is necessary to run a great variety of products and different weights through the weighing operation in a short space of time and each weighing operation may involve only a relatively small quantity of cans of a given size or product and in such cases it then becomes necessary to change over the weighing machine being used, if this can be done, in order to adapt it for use on cans of other sizes and other products having different weights, it being obviously impractical and far too expensive to have a separate size machine for each weight. Such changing over in the ordinary weighing machines entails great expense and great loss of time as delicate adjustments of balance scale units are necessary.

The present invention contemplates rapid and simple weight changes on each scale unit without altering the delicate balance mechanism so that different sorting is quickly provided for these new conditions and so that each scale unit is as every other unit, thus maintaining uniform weighing.

An object of the invention is the provision of a weighing machine which is fully automatic and which receives cans in a continuous manner and without pause weighs the same, after which all of the cans are passed through a sorting mechanism which automatically discharges them in different positions so that cans of the same range of weight are collected and these are separated from those of a different weight range.

A further object of the invention is the provision of a weighing machine of the character described in which the cans are all received, maintained and discharged in one level except during the actual weighing operation during which brief space the sorting mechanism is influenced so that the sorting by weight subsequently takes place during the discharge of the cans.

Another object of the invention is the provision of a weighing machine utilizing a series of scale balances which are primarily balanced for weighing maximum limit cans and are then further and independently balanced to provide for other predetermined can weights less than maximum, this feature providing a wide range of weight differences while permitting rapid changing over to adapt the machine to different weight runs of cans.

A still further object of the invention is the provision of change part adjustment for different can diameters in a weighing and sorting machine of the character described.

Numerous other objects and advantages of the invention will be apparent as it is better understood from the following description, which, taken in connection with the accompanying drawings, discloses a preferred embodiment therof..

Referring to the drawings:

Figure 1 is a plan view of a weighing and sorting machine embodying the present invention;

Fig. 2 is a longitudinal section taken substantially along the line 2—2 in Fig. 1;

Fig. 3 is a plan sectional detail of certain of the driving mechanism as viewed from a plane indicated by the line 3—3 in Fig. 2;

Fig. 4 is an enlarged plan view of the weighing and discharge end of the machine disclosed in Fig. 1, parts being broken back;

Fig. 5 is a front elevation of one of the weighing scale units as viewed from a position indicated by the line 5—5 in Fig. 4, parts being broken back;

Fig. 6 is an enlarged transverse sectional view taken substantially along the line 6—6 in Fig. 1;

Fig. 7 is a fragmentary sectional detail of one of the scale counter-balances as viewed along the line 7—7 in Fig. 5;

Fig. 8 is a further detail of the same being taken substantially along the line 8—8 in Fig. 6;

Fig. 9 is an elevation of a part of the weighing section of the machine as it would look when viewed from a position indicated by the line 9—9 in Fig. 4, parts being broken back;

Fig. 10 is a sectional detail taken substantially along the line 10—10 in Fig. 6;

Fig. 11 is a fragmentary plan sectional view of certain of the weighing units as taken substantially along the broken line 11—11 in Fig. 9;

Fig. 12 is a transverse sectional detail as viewed along the line 12—12 in Fig. 9;

Fig. 13 is a transverse sectional view taken substantially along the broken line 13—13 in Fig. 4; and Figs. 14 and 15 are sectional details taken respectively along the lines 14—14 and 15—15 in Fig. 4.

The apparatus embodying the present invention comprises a continuously moving conveyor on which are mounted a series of weighing scale balance units. A filled can to be weighed is brought into the machine on a continuously moving horizontal chain which carries the cans over a feed table and passes them through a timing device. This timing device brings each individual can into proper time relation to the other operations of the machine. A timed can is then inserted into a scale unit by a rotating star member.

The scale unit with its contained can passes around its path of travel with the moving conveyor, this path being straight on the sides and arcuate at the ends and, during a large part of the travel, the scale pan of the unit with its can is held accurately in a horizontal plane and protected against irregular movement or sudden jar.

In one position of its straight path of travel the can with its scale unit passes into weighing position and the unit is then released from its held condition whereupon weighing of the can is effected. The position of the scale pan is vertically altered if the can contents are under or over a desired range of weight and this change in position is utilized to perform certain results.

The moving weighed can with its scale unit is then passed through a detector unit after which can and scale unit are again restored to the plane of travel as before. The advancing can is then removed from its scale pan and further conveyed in a sinuous path through star-wheels and a turret and is finally discharged onto a discharge table.

The actuation of certain parts of the detector unit through which the scale unit passed is now made manifest as the can approaches its discharge position. Certain of the discharge units carried in the turret into which the can is positioned operate to discharge the can and selectively place it upon one of three conveyors of the discharge table in accordance with its determined weight.

All of the normal weight cans are thus segregated and brought upon the same conveyor and in like manner all of the light and all of the heavy weight cans are similarly disposed of on their respective conveyors. During the passage of the weighed cans over the discharge table and while on their conveyors opportunity is given to an operator or packer to adjust the deficiency or the excess of product in the light and over weight cans so that a uniform normal weight can is obtained in all cases.

The mechanism for performing the various steps in the weighing and sorting operations is carried upon a frame 21 (Figs. 1 and 2) which may be suitably supported at the proper height on legs 22. The frame 21 broadly consists of a horizontal table section 23, a portion of which is extended in one direction as a feed table 24 and in the opposite direction as a discharge or patching table 25.

The various mechanical features of the machine will first be grouped or classified according to the function they perform as to the filled and open top cans and then will be subsequently described in detail.

Filled cans 27 are carried into the machine and to the scale units along the table section 24 on a suitable conveyor chain 28 which not only extends over the feed table section but also throughout the entire length of the machine and into the discharge table section 25 as shown in Fig. 1. A timing device 31 illustrated in Figs. 1 and 6 operates upon the moving cans on the conveyor 28 and times each individual can so that its travel is brought into synchronism with the other operating parts of the weighing machine.

Each scale unit, indicated generally by the numeral 32 and shown in detail in Figs. 4, 5 and 6, is carried on a conveyor 33 which moves over the table 23 and along a combined straight and arcuate path. A feed-in star 35 (Figs. 1 and 6) is used for transferring the timed can from the conveyor 28 into the scale pan of a scale unit 32.

At one position in its straight path of travel the can within its scale unit is subjected to the weighing operation effected by the scale unit in cooperation with weight devices designated by the numeral 36 and shown in detail in Figs. 4, 9, 11 and 12. Following this weighing the travelling scale pan and can remain in a balanced condition or are carried in a higher or lower plane in accordance with its weight. While in such a plane it passes directly into the zone of a detector unit 37 disclosed in detail in Figs. 6, 9 and 10.

Certain detector controls 38 of the unit 37 are set accordingly and the can and its scale unit continues on its path of travel. The detector controls 38 in turn actuate elements in a detector trip unit 41 disclosed in some detail in Figs. 4, 9, 14 and 15. This unit provides for the proper discharge of the weighed can when it reaches the discharge station.

The can as soon as it passes the detector unit is removed from its scale pan and then passes through starwheels 44, 45 (Figs. 1 and 4) which advance it without interruption in its sinuous path, the starwheel 45 positioning the can into the turret of a distributing mechanism 46 shown in detail in Figs. 4 and 13.

The discharge of the can from the turret is made at one of three positions on the discharge or patching table 25 and in this manner is sorted as to weight range on the conveyor 28 if of normal weight, on an adjacent conveyor chain 47 if overweight, or on a chain 48 operating alongside if under or light weight.

It is believed that this brief classification of parts as to their functions on the can will assist in a better understanding of the description that follows wherein the details of the various devices associated with each class of parts will be more thoroughly considered in their individual operation as well as in their relations to other parts.

Filled can feed

The conveyor chain 28 (Figs. 1 and 6) at the entrance end of the feed table 24 operates over an idler sprocket 51 mounted on a stub shaft 52 carried in brackets 53 depending from the feed table 24. The feed table 24, the central table 23 and the discharge table 25 are all grooved at 54 to form a continuous path for the upper run of the chain. It will be understood that there is no structural division between the three tables, a division being indicated only for the purpose of description.

Chain 28 may be driven in any suitable manner, the forward end of the chain being entirely removed in the present disclosure. Guide rails 55, 56 are mounted on the feed table 24 and these retain the cans in a straight path of travel. The guide rails terminate at their forward ends just short of the position of transfer of the can from the conveyor chain.

Timing

The conveyed can 27 upon passing the forward end of the guide rail 55 moves into the zone of the timing device 31. This device comprises a tapered screw 61 which is smaller at the end adjacent to the guide rail 55 but uniformly increases in diameter toward its opposite or forward end. This screw is mounted on a shaft 62 which is positioned at an angle to the horizontal and is continuously rotated so that a spiral thread 63 formed on the screw body engages and spaces the advancing can from the other cans bringing it into proper time with operations of the machine.

Shaft 62 is journaled at its forward and raised end in a lug 64 formed in a bracket 65 which is mounted upon and secured to the feed table 24. The opposite end of the shaft is carried in a lug 66 also formed in the bracket 65. The shaft 62 carries a bevel pinion 67 which meshes with a bevel gear 68 secured to the upper end of a vertical shaft 69 journaled at its top end in a bearing 71 formed in the bracket 65 and at its lower end in a bearing 72 formed in the front wall of feed table 24.

The shaft 69 carries a pinion 73 at its lower end which meshes with a bevel gear 74 secured to one end of a horizontal shaft 75 which is journaled in a bearing 76 formed in the frame 21 and in a bearing 77 formed on the lower end of a depending bracket 78 which projects down from and is an integral part of the frame table 23.

The shaft 75 also carries a bevel gear 81 which meshes with a similar gear 82 secured to a horizontal shaft 83. This shaft 83 extends substantially the entire length of the table 23 (see Fig. 2) and is journaled in a bearing 84 formed in the frame leg 22 and in a bearing 85 formed on a bracket 86 depending from the table 23.

Shaft 83 also carries a bevel gear 87 which meshes with a pinion 88 secured to the lower end of a vertical shaft 89 which extends up and above the table 23. The lower end of the shaft 89 is journaled in a bearing 91 formed in the table and its upper end in a bearing 92 carried in a gear housing 93 (Figs. 1 and 2) which is preferably an integral part of a frame 94 extending upwardly from and carried on the table 23.

The upper end of the shaft 89 where it extends into the housing 93 carries a bevel gear 95 which meshes with and is rotated by a pinion 96 carried on a horizontal drive shaft 97. Shaft 97 is journaled in a bearing 98 formed in the gear housing 93 and one end extends outside of the housing where it carries a belt pulley 99. Driving power for operating substantially all of the parts of the weighing machine may be applied to the belt pulley 99 in any suitable manner as by a belt.

Rotation of the drive shaft through the train of gears, shafts, etc., which have just been described, constantly rotates the timing screw 61 so that the cans are brought into proper timed position while still being carried forward on the conveyor chain 28. The removal of the cans by the starwheel 35 from the conveyor 28 takes place adjacent the large end of the screw thread 63 and each can is deposited into its scale unit 32 as the latter moves tangentially to the starwheel on the side opposite to the timing screw. The cans are held in the starwheel by a curved guide rail 101 (Figs. 1a and 6) which is secured to or may be an integral part of the bracket 65.

The starwheel 35 is mounted upon the upper end of a vertical shaft 104 which is journaled in a bearing 105 formed in the frame table 23. The lower end of the shaft 104 carries a bevel gear pinion 106 which meshes with and is driven by a gear 107 carried on a short horizontal shaft 108.

Shaft 108 is journaled in a bearing 109 formed in a bracket 111 depending from the frame table 23. The shaft 108 also carries a sprocket 112 over which operates a chain 113 which also passes over and is driven by a sprocket 114 carried on the shaft 75. In this manner the rotation of the shaft 75 is communicated to the shaft 104 and the starwheel 35 is accordingly moved to effect the transfer of the cans from the conveyor chain 28 to the scale units 32.

Scale unit and conveyor

Each scale unit 32 comprises a scale pan 121 (Figs. 1, 4, 5 and 6) which extends horizontally and at one side and as an integral part of an arm 122 which merges into a top arm 123. The arm 123 is formed with an enlarged boss section 124 which provides for the pivotal support of the scale pan.

A scale beam 131 is associated with each of the scale pans and its end forward of a pivotal support is formed into spaced, parallel arms 132 which extend on opposite sides of the faces of the boss 124. Each arm at its forward end carries a pointed setscrew 133 threadedly engaged therein and the pointed ends of the screws extend into counterbores 134 formed in the opposite faces of the boss 124. This provides an anti-friction connection between the beam 131 and the pan arm 123.

Each arm 123 also carries a post 135 which extends up and in a vertical line with the center of gravity of the pan unit and with the center of gravity of a positioned filled can 27 on the scale pan 121. Scale weights 136 of different sizes and weights are provided for the weighing operations under certain conditions and these when used are adapted to be carried on the post 135 (Fig. 6). By placing these posts over the center of gravity, the scale pan is less affected by a taking off or a putting on of scale weights and its balance is more nearly maintained against swinging.

The total weight of the scale pan 121 with its arms 122, 123 plus the desired normal weight of a filled can being weighed, that is the total weight suspended from the beam 131, is preferably maintained constant. To do this, since the weight of pan arms, etc., remains the same, any change of the desired normal can weight must be accompanied by a compensating element to make up the difference in desired weight.

The different size scale weights 136 are used for this compensation. Accordingly when maximum normal weight cans are being run through the apparatus the weights 136 are not used, but any desired weight range less than the maximum requires certain of the weights to bring the total up to the maintained constant referred to.

To further illustrate by way of a concrete example assuming twenty two ounces as the maximum normal weight can, such a can is passed through the machine without the use of any scale weights 136 on the posts 135. For a can less than the maximum of 22 ounces, for example, a normal weight can of 16 ounces, the constant gross weight referred to of can and scale pan is maintained by adding scale weights 136 totaling 6 ounces on the post 135 of each scale unit 32. In like manner any weight range between limits is quickly obtained in the machine without altering any adjustments or disturbing any delicate balances. This is what is meant by changing over the weighing machine for a different weight run of cans.

The beam 131 (Figs. 4 and 6) of each scale unit is pivotally mounted on suitable anti-friction knife edge pivots 137 which rest in seats 138 carried in upper spaced ends 139 of a support bracket 141. Each bracket 141 is formed with spaced depending lower legs 142 which extend along the sides of its associated scale pan arm 122. The lower ends of these legs are enlarged and are provided with elongated slots 143 (Figs. 5 and 6).

Each scale pan arm 122 carries a horizontal pin 144 which extends out on either side, its ends projecting through the elongated slots 143 of the bracket legs. This construction provides a more controlled weighing unit and prevents undue swinging of the scale pan when a can is being placed upon it or during removal of a can from the pan but does not interfere with its accurate weighing functions.

Each bracket 141 is secured to a right angled block 145 by bolts and each block constitutes an element in the conveyor 33. The blocks 145 rest upon and move over a trackway 146 formed in the table 23. This is a smooth track and extends all of the way around the table 23 and the feet of the blocks 145 are sufficiently large to form a substantial support so that the scale units are advanced throughout their path of travel without undue jarring or sudden change of movement.

A slot 147 (Figs. 1, 4 and 6) is cut in the top of the table 23 and extends along the center of the track 146 and this slot is formed with accurately finished side walls which extend in parallel spaced straight portions and concentric arcuate end portions and determine the path of travel of the can units 32. Each block 145 carries a pair of shouldered bolts 151 which are threadedly secured in the block and are held in a clamped position by lock nuts 152.

Each bolt supports a roller 153 formed with a conical lower end 154, this roller fitting nicely within the track slot 147 being freely movable therein, the head of each bolt 151 holding its roller up in the slot.

Bolts 151 in adjacent blocks 145 are loosely connected by links 155 and link, block and bolt provide the connecting elements for the conveyor 33. The rollers 153 accurately guide the conveyor unit in an even motion as it is moved around its path of travel and also form the spaced engaging elements for the teeth of the drive sprockets over which the conveyor operates. This will be fully explained in the pages to follow.

Each balance beam 131 extends back of its knife edge support in a single T-shaped arm 157 (Figs. 6, 7 and 8) on the top of which a balance or counterweight 158 is carried. This weight is adjustable as to its position on the beam and when the exact balance is obtained is securely locked in place. The balancing of each scale beam by the weight 158 is made to obtain the desired setting for the device to correctly balance the constant full weight of can, scale pan and other parts previously mentioned. Provision is made for a micrometer adjustment.

The beam 131 adjacent its knife edge support is formed with an upwardly extending finger 159 which is slotted on top for the reception of a reduced section of a head 161 of an adjusting screw 162. This construction allows for free turning of the screw but prevents longitudinal movement. The rear end of the screw 162 threadedly engages the counterweight 158 and turning of the screw moves the weight nearer to or farther from the balance center of the scale beam. The head 161 may be knurled to facilitate turning of the screw.

When in adjusted position the weight 158 is clamped on to the beam arm 157 and this is accomplished by a clamp rod 163 which extends loosely through the counterweight along one side. This rod has a hooked end 164 which extends under the beam arm 157, its end passing up into the weight. A thumb nut 165 threadedly engaging the upper end of the rod and resting against the top of the counterweight, when properly turned, pulls the rod up into clamping position locking the counterweight in its adjusted position.

The counterweight is also formed with a horizontally extending chamber 166, closed at one end by a screw plug 167, in which mercury may be enclosed to partially fill the chamber. This provides a shiftable weight element, the mercury tending to quickly flow from one end to the other of the chamber upon the slightest tilting of the beam. The body of mercury, it will be observed, is placed high up and above the knife edge pivotal support 137 as this increases its sensitiveness and also the rapidity at which the shifting of the weight center takes place when the beam does start the tilt under an over or an underweight can.

The conveyor chain 33 operates over a pair of sprockets 171, 172 (Fig. 2) the former being mounted on and driven with the shaft 89 above its bearing 91. Sprocket 172 is mounted on a vertical shaft 175 which below the table 23 is journaled in a bearing 176 formed as a part of the table. This shaft 175 carries the detector trip unit 41 and is also positively rotated by geared connection with the shaft 83. For this purpose the shaft 175 carries a bevel gear 177 which meshes with a pinion 178 mounted on and rotated by the shaft 83. In this manner both of the sprockets 171, 172 are positively driven in unison.

The table 23 extends up, centrally of the vertical shafts 89, 175, as a support section 181 which carries an auxiliary frame 182. This frame extends between the vertical shafts and is formed at one end with a boss 183 where it provides a support for the rotating shaft 89 and at the other end with a sleeve 184 in which the upper end of the shaft 175 is journaled.

The holding of a balance beam 131 throughout a large part of the travel of the conveyor 33, which has already been suggested, is accomplished by means of a cam track 186 (Figs. 2, 6 and 9) formed in the peripheral wall of the auxiliary frame 182. Each beam arm 157 is formed with a knob end 187 which extends into and rides in the slot 186. On the front side of the machine, that is adjacent the conveyor 28, the cam track is disposed at an upper level and this is also true at the ends, that is, around the arcuate sections of the cam track. This higher cam section holds a scale pan 121 at its lowest level at which level it receives a can presented by the starwheel 35.

Each scale unit 32 also carries a can mold 188 (Figs. 5 and 6) which is removably secured to its associated arm 122 by a screw 189. This mold confines the can in an exact aligned position on the scale pan 121 and prevents lateral shifting while maintaining the center of gravity of the scale unit.

The mold 188 is a change part and when a different diameter of can is to be run through the machine the mold on each scale unit is changed so that the proper diameter mold is provided. All of the molds are the same weight and this changing of a mold for a change in diameter of the can in no way affects the balance of the scale units.

*Filled can weighing*

After a can has been carried around one end of its arcuate track and as its scale unit begins to travel on the straight path at the rear of the machine it passes into position for weighing. In coming into weighing position, the scale pan is first brought up so that its beam arm 157 is horizontal. This raising of the scale pan is brought about as its knob end passes down an inclined section 191 (Fig. 9) of the cam track 186.

The scale beam 157 is now held in its horizontal position while its knob end 187 passes into an intermediate horizontal cam slot section 192. This cam section 192 is sufficiently long to permit steadying of the scale unit while it continues its advance and thus prepares the unit for its weighing operation while the beam end 187 comes under the influence of the weighing devices 36.

At the end of the cam track section 192 the lower wall of the cam groove dips down in an inclined track wall 193 but the upper wall of the cam groove 192 is continued in the same horizontal plane as the under surface of three weighted balance gates 194, 195 and 196. Each gate is an integral part of a lever arm 197 (Figs. 4, 9 and 12) which extends at right angles and which is pivoted on a horizontal rod 198 carried in bearing lugs 199 mounted on and extending up as an integral part of the auxiliary frame 182.

Each lever arm 197 beyond its pivot mounting on the rod 198 carries an adjustable counterbalance 201 which may be changed in position on the arm and after adjustment is locked by a setscrew 202. By means of this counterbalance a greater or lesser resistance against lifting of the gate may be imposed as desired.

The first gate 194 (Fig. 9) normally rests with its lower face in horizontal alignment with the upper wall of the cam groove 192, the frame 182 at the end of the groove being extended in a projection 205 which provides a support for the first gate. The gate is notched at 206 where it engages this projection 205 so that the lower surface of the gate presents a smooth and uninterrupted surface.

In like manner the first gate 194 supports the adjacent or middle gate 195 and for this purpose is formed with a projection 207 on which the second gate normally rests, the latter being notched at 208 for the same purpose. In like manner the second gate 195 is formed with a projection 209 and a notched part 211 of the third gate 196 normally receives the projection of its adjacent gate. A smooth and uninterrupted surface along the three gates is thus obtained and it is along this surface that the knob end 187 of a scale beam arm 157 passes.

In the event that a can is light or under weight on a scale pan 121 of the unit 32 which comes into weighing position when the knob end 187 leaves the cam track section 192, the counterweight 158 of the balance beam overbalances the load on the scale pan and associated parts and this lowers the beam arm 157. The mercury in the counterweight 158 thereupon quickly flows away from the pivotal center of the beam and helps to force the knob end 187 down against the inclined cam track 193.

In Fig. 9 the second knob end 187 from the right exemplifies such a light weight can and shows the knob end riding down on the cam surface 193. As such a beam arm passes under but clears the weighted gates 194, 195, 196 its knob end has no effect upon the gates. As the knob end reaches the end of the inclined cam surface 193 it is in its lowest position and in that position moves on through the detector unit 37.

In the event that a can is over weight the knob end 187 upon leaving the upper wall of the cam track 192 rides along the lower surface of the first weighted gate 194. If the over weight is sufficient to counterbalance the combined weights of the three gates as soon as the knob end clears the projection 205 it will raise these gates, the inter-connections 207, 208 and 209, 211 locking the gates together. This provision is made so that an exceptionally heavy can will not violently throw the weight devices out of position but will permit an easy movement as the scale beam moves into its weighing position.

A strap 215 (Figs. 4 and 9) is mounted on the auxiliary frame 182 and extends above the three weight gates. Stop screws 216 are threadedly mounted in the strap 215 and are locked in adjusted positions by lock nuts 217. A stop screw 216 is located in vertical position above the center of each gate and provides a limit stop for the gate.

If an overweight can coming into weighing position is not sufficiently over weighted to overcome the combined resistance of the three gates the knob end 187 passes along the lower surface of the first gate 194 which remains in position. If this over weight, however, is sufficient to lift the two gates 195, 196 these gates move up as soon as the knob end leaves the projection 207 of the first gate and passes into engagement with the second gate.

A still lighter can but one which is still over the weight range for a normal can will be insufficient to lift the two gates 195, 196 but may lift one gate. In such an event no movement of the scale beam will take place until after its knob end 187 has cleared the projection 209 of the second gate and comes into engagement with the third gate 196. For this last condition see Figs. 9 and 12 which show the third gate 196 in its raised position, all overweight cans lifting this gate in the weighing operation.

In the two former cases, that is, a can of excessive weight sufficient to raise the three gates 194, 195, 196 and in the next lighter but over weight can sufficient to raise the gates 195, 196 each gate, as it is cleared by the knob end of the beam, falls back into position. This gate movement, however, does not disturb the scale beam passing under the gates.

It will be observed by reference to Fig. 9 that the interval between adjacent scale beams 157 is such that a knob end 187 of one beam is coming into position under the first gate as the knob end of the scale unit ahead is leaving the third gate. In the event the two adjacent scale beams have cans which are over weight the maximum amount the following beam will pass under the first gate 194 before the forward beam end has released the third gate 195 and in this condition the following scale unit will be acted upon by the first and second gates only.

In any event this construction insures an even shifting of the scale units in the case of over weight cans. This construction also permits immediate and successive return of the balance gates and provides a stabilizing influence proportional to the amount of over weight in the heavy weight filled cans. With all of the cans heavier than the normal weight range, the knob end of the beam arm 157 associated therewith remains in raised position and in such position moves into the detector unit 37.

In the event that the can upon the scale beam is within the normal range of weight so that its balance beam 131 is maintained in a horizontal position its knob end 187 rides along under the weight devices 36 without operating any of the gates and so passes into the detector unit 37 in a middle horizontal position. The operation of the unit 37 will be fully described but first the further passage of the cans and the beam ends will be briefly noted.

All of the knob ends 187 after passing through the detector unit 37 and still within their plane positions above, in the middle, or below, are again brought into the upper cam track level 186 and are thence moved toward the discharge end of the machine at this level which it will be remembered was the receiving level. The normal and the light weight cam units after passing the detector unit 37 ride upon an inclined cam track 218 which joins with the widened cam groove beyond the detector unit and this merges into the upper level of the cam groove 186.

*Detector unit and setting of detector controls*

The detector unit comprises a pair of swinging members one of which is moved when a light or under weight can passes with its beam arm knob end 187 in the lower part of the widened cam track. The other swinging member is actuated when an over weight can is passing with its beam arm knob end in the upper part of the cam groove. Passing normal weight cans with their beam knobs in the central or middle track have no effect at all upon the swinging gate members or upon the detector control unit 37.

One of the swinging members comprises a long arm 225 (Figs. 9 and 11) which extends down in a recess 226 formed in the auxiliary frame 182. The arm 225 carries a shoe 227 the ends of which are bent into inclined end walls 228. The arm 225 is pivotally swung from a horizontal rod 229 which is held in a lug 231 formed on the side of a column 232 which extends up from the auxiliary frame 182. The opposite end of the rod 229 is held in a lug 233 formed in the sleeve 184 of the auxiliary frame 182.

When a light or under weight can unit moves past the shoe 227 its beam end 187 engages first the forward inclined wall 228 of the shoe and thence as the knob end further advances it forces the shoe further into the recess 226, this action swinging the arm 225 on its rod 229.

The second of the swinging members comprises a short arm 235 which is positioned along side of the arm 225 and is also swung on the rod 229. This arm carries a shoe 236 at its bottom end which also extends into the recess 226 and is located directly above the shoe 227. The shoe 236 is also formed with inclined end walls 237 and as an over weight can is moved past the swinging members its beam arm 157 engages first the forward inclined wall 237 and then, moving along the shoe, swings it back and rocks the arm 235 on the rod 229. A swinging of either of the arms 225, 235 affects the detector control 38 associated therewith.

The light can arm 225 is formed with a projection 255 (Figs. 6 and 9) which is connected by a link 256 to an arm 257 (see also Fig. 10) which is pinned to a short rock shaft 258 pivotally mounted in lugs 259 constituting a part of the column 232. The shaft 258 also carries a flipper member 261 constituting a part of the detector control 38. Flipper 261 normally rests at a slight angle to the vertical or in the position indicated in Figs. 9 and 10, this being the position when the arm 225 is hanging free and with its shoe 227 disengaged.

This position is held by means of a spring 262 which is associated with a spring barrel 263 having sliding movement within a hollow boss 264 formed in the column 232. When in such inclined position the flipper is out of the path of travel of certain parts of the detector trip 41 which will be hereinafter fully described.

As soon as the beam knob 187 of a passing light weight can engages the shoe 227 and swings the arm 225, the shaft 258 is rocked in a counter-clockwise direction (Figs. 9 and 10), and the flipper 261 is brought into a vertical position against the tension of spring 262. In this position it is adapted to engage the detector trip mechanism 41.

In a similar manner the short or over weight can swinging member 235 is connected with a flipper in the detector control unit 38. This arm 235 is formed with a projection 241 (Figs. 6 and 9), the end of which is connected by a link 242 to an arm 243 secured to a short horizontal rock shaft 244 which is mounted in lugs 245 formed in the column 232.

A flipper 246 is pinned to the shaft 244 and its normal position is also at an angle to the vertical as illustrated in Fig. 9 with its associated arm 235 swinging free and with its shoe 236 non-actuated. This inclined position of the flipper 246 is maintained by a spring 247 which cooperates with a spring barrel 248 having sliding movement in a hollow boss 249 formed on the column 232.

When the shoe 236 is engaged and the arm 235 is swung on its rod 229 the shaft 244 is rocked sufficiently in a clockwise direction to bring the flipper 246 into vertical position (Fig. 10) and it is then in the path of travel of the detector trip mechanism. When either the flipper 246 or the flipper 261 is in a vertical position that particular flipper actuates and sets part of the detector trip 41 which will now be described.

*Detector trip*

The detector trip mechanism 41 is carried on the upper end of the shaft 175 (Figs. 2, 4 and 9)

and comprises a detector disc 271 formed with a sleeve 272 which is pinned at 273 on the upper end of the shaft. This disc 271 is continuously rotated with the shaft and one side passes adjacent the column 232 and in between the flippers 246, 261. The disc 271 is formed with a number of vertically disposed bores 274 which are spaced an equal distance apart and are located adjacent its periphery.

A vertically movable trip rod 275 is carried in each of the disc bores and each rod is reduced in diameter at its top and at its bottom in stems 276 where it extends above and below the disc. Each trip rod has three vertical positions within its seat 274. One is a central position at which the rod is always set if not shifted by either flipper 246 or 261. This position corresponds to a normal can not actuating the swinging arms 225, 235. The second is an upper position corresponding to a heavy or over weight can wherein the flipper 246 is vertical and the third is a lower position which corresponds to a light weight can and wherein the flipper 261 is in operating position.

Each trip rod 275 is formed with three horizontally disposed grooves 277 and a spring detent unit holds the trip rod in one of its selected positions. This detent unit comprises a ball 278 which is backed up by a spring 279 confined within a horizontal bore 281 cut in the disc 271 adjacent the vertical rod bore 274. The spring 279 forces the ball 278 into one of the grooves 277 after the trip rod has been placed into its normal, heavy or light groove.

As an individual trip rod 275 approaches the detector control unit 38 it passes between an upper reset cam 285 (Figs. 6 and 9) and a lower reset cam 286, these cams each being secured to the column 232. Engagement of the stems 276 with either of the reset cams 285, 286, no matter in what position the trip rod may be relative to the disc 271, brings the rod into its middle or normal position. If it is already in middle position it passes the cams without engaging either.

Figures 6 and 10 illustrate the setting of a trip rod 275 through the action of the heavy weight can flipper 246 which provides a cam track on which the lower stem 276 rides (as the rod 275 is moved upwardly as viewed in Fig. 6). When the trip rod passes beyond the inclined track of the flipper it is in its raised position and is held there by the spring detent 278.

In like manner a rod 275 may be depressed as it passes through the detector controls, but when this occurs the top flipper 261 is in vertical position and its lower inclined cam track is positioned to form a prolongation of the inclined track of the reset cam 285 so that the upper stem 276 of the trip rod is engaged and the rod is accordingly shifted into its lowermost or light can position.

The vertical position of a trip rod produces certain results which will now be considered. A collar 288 is pinned on the lower stem 276 of each trip rod 275 and it is this collar that operates certain devices located below the disc 271 and cooperatively associated with the discharging of the cans by the distributor mechanism 46, the vertical position of the collar providing for the selective operation of the discharge elements.

The devices referred to are carried on a stationary support plate 301 (Figs. 4, 9, 14 and 15) which is mounted on the sleeve 184. The shaft 175 extends up and through this plate, the plate being formed with a boss 302 on which the moving sleeve 272 of the disc 271 rests. There are two stages of actuation connected with the selective discharging of weighed cans by the distributing mechanism 46, there being a shiftable member pivotally mounted on the plate 301 for each stage. A shiftable member is actuated if the collar 288 of a trip rod 275 is at the proper height or level to engage with a cam surface formed on the member.

The first of these shiftable members comprises a block 305 (Figs. 4 and 14) which is pivotally mounted on a vertical shaft 306 held in the plate 301, an upper bearing being formed for the shaft by a lug section 307 which extends up from the plate 301 and over the block 305. Block 305 is extended laterally in an arm 308 which projects down at its end in a lug 309.

The lug 309 is engaged by a spring barrel 311 which forms one element of a spring unit, this barrel having a loose pivotal engagement with the lug at 312. The spring barrel 311 slides within an outer spring barrel 313 which is formed with a projection 314 which has a loose pivotal connection with a lug 315 projected upwardly from the plate 301. A spring 316 is confined within and between the sliding spring barrels 311, 313 and tends to force them apart. This spring unit holds the block 305 in one of its two positions, the arm 308 in swinging from one position to the other moving the spring barrel unit past the line of centers of its pivotal mountings so that the action of the spring is always effective in holding the block after it has been positioned.

A pair of spaced posts 321, 322 are carried by the block 305, on the side opposite to the arm 308, and extend up at different heights above the block. The post 321 is formed with upper and lower spaced projections 323, 324 which are on the outside of the post. The projection 323 is in the plane of a collar 288 of a trip rod 275 when the rod is in its raised or uppermost level, this being the level corresponding to an over weight can. The projection 324 extends in a horizontal plane corresponding to the position of a trip collar 288 when in its lowest plane, that is, corresponding to a light weight can.

The post 322 is formed with a single projection 325 which extends on the inside of the post, that is, toward the other projections 323, 324. This projection 325 is at an intermediate level corresponding to the level of a trip collar 288 when its trip rod is in the normal can plane. The inner faces of the projections 323, 324, 325 are inclined as shown in Fig. 4 and accordingly when a collar 288 of a trip rod 275 moves between the posts 321, 322 it engages one of the projections if such projection is in its path. Where such engagement occurs the block 305 is shifted on its shaft 306.

In Figs. 4 and 14 there is illustrated a collar 288 located at the middle level for a normal can coming into engagement with the normal projection 325. In Fig. 4 the disc 271 which carries the trip rods 275 moves in a clockwise direction. After engaging the projection 325 the advancing trip collar forces the post 322 outward or away from the center shaft 175 which causes the block 305 to move on its shaft 306 in a counter clockwise direction. This performs a certain result in the distributing mechanism 46 as will be hereinafter fully explained.

Devices for the second stage of actuation referred to are disposed in the further path of travel of the detector rods 275 carried around by the disc 271 and these devices comprise a second block 326 which functions in a manner similar to the block 305. The block 326 (Figs. 4 and 15) is mounted on a vertical shaft 327 which is carried by the plate 301, an upper bearing for the shaft being formed by a lug 328 projecting upwardly from the plate and extending over the block.

The block 326, like the block 305 has two positions of rest, and a spring barrel unit 329 (identical in construction and operation with the unit composed of the barrels 311, 313) is used to hold the block in one or the other of its positions. This spring barrel unit 329 is located below the block 326 and one end is loosely pivoted in an upstanding lug 331 formed in the plate 301 and its opposite end is loosely mounted in a lug 332 projecting down from the block.

Block 326 also carries a pair of posts 333, 334 which project up from its upper surface and, similar to the posts 321, 322, have inward projections, one projection 335 for the post 333 and another projection 336 for the post 334. The projection 335 is disposed in the lowest plane of a trip collar 288 when the trip rod has been depressed into its lowest position for a light weight can. The other projection 336 is in the top plane for such a trip collar, this being the heavy or over weight can position.

It will be observed that there is no normal or middle plane position of projection for either the post 333 or 334. Such a normal weight can position is not necessary as the actuation of the discharge mechanism for normal cans has already been carried out by a shifting of the first block 305.

Figures 4 and 15 illustrate a trip collar 288 which has already engaged the projection 336 and has already shifted the block 326 in a clockwise direction (as viewed in Fig. 4). This shift of the block 326 has affected certain of the discharge elements in the distributing mechanism 46 so that a heavy weight can will be properly conveyed to the patching table 25 and moved onto its discharge chain 47 at the proper time. This work performed by the shifting of a block 305 or a block 326 and the mechanism whereby an associated can is properly removed from the distributing unit 46 will now be described.

Distributing and sorting

After a can has been weighed, has passed through the swinging members 225, 235, and has been started around the arcuate end of its path of travel, it is brought into the starwheel 44. This starwheel, as best illustrated in Figs. 4 and 13, is mounted on the upper end of a vertical shaft 341 which is journaled in bearings 342, 343 formed in the table 23 and in the frame 21. The starwheel 44 is continuously rotated and for this purpose its shaft 341, below its bearing 342, carries a sprocket 344. During the travel of the can over the table 23 by the starwheel 44 it is guided in a circular path of travel by a guide rail 345 which is connected to and is an integral part of a plate 346 formed in a bracket 347 mounted upon and secured to the table 23.

The starwheel 44 transfers a can 27 into the starwheel 45 and the can is then retained in its path of travel by a curved guide rail 348 which is mounted upon and secured to the table 23. Starwheel 45 is carried on the upper end of a vertical shaft 351 (Figs. 4 and 13) which is journaled in bearings 352, 353 formed in the table 23 and in the frame 21. This shaft 351 like the shaft 341 is continuously rotated and for this purpose carries a sprocket 354 which is located just below the bearing 352.

The sprockets 344, 354 are driven in unison by a chain drive 355 (Figs. 3 and 13). The chain 355 besides passing over the two sprockets also passes over other sprockets, and simultaneously operates in addition to the starwheels 44, 45, also a turret associated with the distributing mechanism 46.

The drive chain extends from the sprockets 344 over a third drive sprocket 356 (Figs. 2 and 3) which is mounted on the upper end of a vertical shaft 357 journaled in a bearing 358 formed in the frame 21. The shaft 357 also carries a bevel gear 359 which meshes with a similar gear 361 secured to the end of the shaft 83. It is by means of this drive sprocket 356 that the chain 355 is operated.

The chain 355 extends between the sprockets 354, 356 and thence passes over a sprocket 362 (Figs. 3 and 13) which is carried on the lower end of a sleeve 363 which is a part of the turret of the distributing mechanism previously mentioned. This sleeve rotates on a fixed vertical shaft 365 which extends up from the frame 21 and is held securely in a boss 366 formed in the frame.

The chain 355 after passing over the sprocket 362 engages and operates an idler sprocket 367 which rotates loosely on a vertical shaft 368 held in bearings 369, 371 formed in the table 23 and the frame 21. From the idler sprocket 367 the chain passes back and over the sprocket 344 as previously described.

The starwheel 45 delivers the can into one of a series of spaced pockets 375 (Figs. 4 and 13) formed in a turret 376. The turret 376 is formed by four horizontal spaced discs 377, 378, 379, 381 which are all joined into a single unit on a central hub 382. This hub rotates around the vertical shaft 365 and the lower disc 381 is an integral part with the sleeve 363.

Each turret pocket 375 is formed in the two upper discs 377, 378 and a can 27 when within a pocket rests upon the third disc 379 and in this position is carried in the turret 376. After the can is received within a turret pocket it is carried by the turret in a circular path of travel through half or more of a circle depending on its weight and along a guide wall 384 which is an integral part of the bracket 347 and which also connects directly with the wall 346 as best shown in Fig. 4.

Discharge devices are carried by the turret 376, one of these being associated with each of the turret pockets. A discharge device comprises an upper ejector lever 391 which is located beneath the top disc 377 and which is adjacent each turret pocket and a lower ejector lever 392 of the same pattern which is located beneath the second disc 378 and is in alignment with the upper lever. The two levers 391, 392 of each set move together and are secured to a vertical rock shaft 393 which is journaled in bearings 394 formed in the four respective turret discs.

Each shaft 393 is frictionally held within its bearings 394 by a friction brake unit which is mounted on the lower end of the shaft and is disposed between the discs 379, 381. This friction brake comprises a disc body 395 which is pinned to the shaft and which carries a friction washer 396. The upper surface of this washer engages the lower surface of the turret disc 379, and is yieldingly held in frictional engagement therewith by a spring 397 which is mounted on the shaft 393 and which is interposed between the lower disc 381 and the brake disc body 395.

The ejector levers have an inner position (Fig. 4) and an outer or discharge position. In the inner position the levers rest clear of the turret pocket but in engagement with a can 27 within its turret pocket. In the outer or discharge position of the ejector levers, they extend beyond the turret disc walls and discharge movement is brought about by a shifting of the shaft 393. When such a shifting takes place depends upon the weight of the can in the turret pocket and this in turn relates back to the operation of the blocks 305, 326 in the detector disc unit 41.

Each shaft 393 carries an arm 401 (Figs. 4 and 13) which is secured to its upper end above the top disc 377. Each arm 401 carries a pin 402 on which is rotatably mounted a roller 403. It is the engagement of the roller 403 of each arm 401 which effects a shifting of the shaft 393.

Two movable cam units are provided, one of these units being connected with the block 305 and the other with the block 326. Each cam unit has two positions, one a non-actuating position where the cam element is held above the path of travel of the roller 403 on an arm 401, the other in the path of travel of such a roller. The shifting of the block 305 or block 326 results in positioning the associated cam unit for engagement with a roller 403 advancing to that position or out of engagement. This will be better understood by reference to Figs. 4 and 13, the operation of the normal cam unit being first considered.

The stationary shaft 365 carries at its upper end a cam sleeve 405 on which the cam units referred to are hingedly supported. This cam sleeve is formed with a pair of laterally extended lugs 406 which support a short horizontal shaft 407 on which a cam block 408 is mounted. This block has a cam surface 409 formed on its outer side and constitutes a normal cam unit which has an upper or raised position as illustrated in Fig. 13 and a lowered position when it is substantially horizontal.

When in the raised position it is out of the path of travel of a roller 403 but when in lowered position its cam surface 409 is in the path of and is engaged by the roller of the next adjacent advancing arm 401. Engagement between the roller and the cam surface results in a turning of the shaft 393 and in an outward swing movement of the ejector levers 391, 392. This outward movement takes place as the cam within an associated turret pocket is adjacent the chain and near the discharge or patching table. The moving ejector levers discharge the can 27 from the turret pocket and place it upon the conveyor chain 28. Each can that is so positioned on the conveyor 28 is within the normal weight range inasmuch as the actuation of the shaft 393 of the ejector levers takes place at this position only when the cam block 408 has been depressed by the shifting of the block 305 in a counter clockwise direction (Fig. 4) as has already been explained, a guide rail 414 mounted on the table 25 assisting in holding the cans on the chain 28. The connection between the block 305 and the cam block 408 is made in this manner.

The cam block 408 carries a pin 415 which provides a pivotal connection for an adjustable connecting rod 416 which is pivotally connected at its upper end to an arm of a bell crank lever 417. Lever 417 has pivotal movement on a pin 418 carried in lugs 419 formed in the sleeve 405. The opposite end of the bell crank lever 417 is pivotally connected to an adjustable connecting rod 421 which is pivotally connected at 422 to the shift block 305.

This shifting of the cam block 408 into actuating position is accomplished when a collar 288 rides against the projection 325 of the post 322 and shifts the block 305 from the position illustrated in Fig. 4 into its other position. The spring barrel unit 311, 313 holds the block 305 in its shifted position and therefore the cam block 408 remains in its lowered position as long as normal cans follow.

As long as the cam block is down each roller 403 coming into engagement with its cam surface 409 is shifted and a can within the turret pocket is ejected onto the discharge section of the chain 28. The largest percentage of cans passing through a weighing machine, providing the filling machine is properly adjusted, is within the normal range and this holding provision prevents unnecessary and extra shifting of the trip controlled devices, etc., greatly reducing the wear and tear on the machine.

As soon, however, as a light or a heavy weight can sets its associated trip rods 275 to position its collar 288 for actuation of the projection 323 or the projection 324 of the post 321, shifting of the block 305 takes place. Such a shifting action lifts the cam block out of its operating position (Fig. 13) and therefore the can, within the turret pocket then passing tangent to the chain 28, will remain within its pocket and will later be discharged as a heavy can onto the chain 47 or as a light can onto the chain 48. The discharge of a heavy can will next be considered.

A second cam block 425 (Figs. 4 and 13) is provided and like the block 408 is pivotally mounted within the lugs 406 of the sleeve 405. This cam block has a cam surface 426 which is brought down into the path of travel of a roller 403 when the cam block moves into horizontal position, this position being shown in Figs. 4 and 13.

Upon engagement of the next advancing roller 403 with the cam 426 the shaft 393 is shifted and its associated ejector levers 391, 392 are moved to throw out the can from the turret pocket. This only takes place when the can is a heavy can, that is, one in excess of the normal weight limit. All heavy cans are moved onto the discharge chain 47 of the patching table 25 passing at such time between guide rails 427, 428, both carried on the patching table, the former providing a separation between the normal can lane on chain 28 and the heavy can lane on chain 47.

The lowering of the cam block 425 into actuating or discharge position is effected by a shifting of the block 326 in a clockwise direction, as illustrated in Fig. 4. The connection between the cam block 425 and the arm 326 is made in a similar manner to the connection between the cam block 408 and the block 305.

The cam block 425 is pivotally connected to an adjustable connecting link 431 which is pivotally connected to one arm of a bell crank lever 432 pivoted on a pin 433 carried in lugs 434 formed in the sleeve 405. The opposite arm of the bell crank lever 432 is connected to an adjustable connecting rod 435 which is also pivotally connected at 436 to the block 326.

Lowering of the cam block 425 for effecting a discharge of a heavy can is brought about when the projection 336 of the post 334 is engaged and the block 326 is shifted. The spring barrel unit 329 holds the shifted block 326 in that position until a subsequent light can sets one of the trip rods 275 to bring its collar 288 into engagement with the projection 335 of its post 333 and thus change the position.

It will be understood that where normal cans follow the heavy can which positioned the cam block 425, normal can ejection will take place in the usual way and when the emptied pockets of the turret come into position adjacent the cam block 425 their ejector levers 391, 392 will again operate but this is an idle movement the can for that pocket having already been discharged.

In the event of a light can discharge both the cam blocks 408, 425 are raised and out of actuating position so that the ejector levers 391, 392 will not be moved until the can has passed by the discharge positions for the chains 28 and 47. Such a light weight can is ejected on the chain 48 and is thence conveyed between the guide rail 428 and a parallel rail 437 also mounted on the patching table 25. This discharge of a light weight can is brought about by cooperation of a stationary cam surface 441 and an arm roller 403 and this cam surface is formed in a cam plate 442, which is an integral part of and which extends out from the sleeve 405.

After a light can has been ejected from the turret pocket by engagement of its associated roller 403 with the cam surface 441, the roller is brought into the mouth of a double walled cam 443 which is formed by depending cam walls 444, 445 projected from the cam plate 442. These walls 444, 445 gradually move each arm 401 so that each shaft 393 is brought back into its normal position with the ejector levers 391, 392 contained within the turret discs 377, 378 and out of the way of an incoming can.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can weighing machine, the combination of an endless conveyor, scale units carried by said conveyor and adapted to receive and weigh cans, a revoluble turret for receiving said cans after weighing, discharge mechanism carried by said turret for moving the weighed cans successively therefrom, and means actuated by the said scale unit and selectively determined by its weighing position at the time of weighing and in accordance with the weight of the can then in said unit for selectively operating the said discharge mechanism so that the discharge of cans is accompanied by a segregation into groups of the same weight range.

2. In a can weighing machine, the combination of an endless conveyor, scale units carried by said conveyor and adapted to receive and weigh cans, a discharge table for receiving said cans after weighing, a light, a heavy and a normal can weight conveyor located on said discharge table, means actuated by the said scale unit and selectively determined by its weighing position at the time of weighing and in accordance with the weight of the can then in said unit for selectively placing the can in the proper light, heavy or normal can weight conveyor as it is brought onto the said discharge table, and holding elements for maintaining the setting of said discharge mechanism until changed by a succeeding can in a following scale unit which has a different weight range.

3. In a can weighing machine, the combination of an endless conveyor, scale units carried by said conveyor and adapted to receive and weigh cans, a can mold associated with each of a said scale unit and adapted to hold a can of predetermined diameter in proper position for weighing, said mold being removable and interchangeable to adapt the machine for the weighing of cans of a different diameter, a revoluble turret for receiving the weighed cans from said scale units, and discharge mechanism carried by said turret for selectively removing at spaced locations in the path of said turret, cans of light, heavy and normal weights.

4. In a can weighing machine, the combination of an endless conveyor, scale units carried by said conveyor and adapted to receive and weigh cans, a can mold associated with each of a said scale unit and adapted to hold a can of predetermined diameter in proper position for weighing, said mold being adjustable to adapt the machine for the weighing of cans of a different diameter, a revoluble turret for receiving the weighed cans, and means cooperating with said turret and actuated in accordance with the weights of the individual cans as determined by the scale unit containing the same for discharging the weighed cans from said turret and segregating the weighed cans in a suitable place of deposit.

5. A scale unit for a can weighing machine comprising, in combination, a support bracket, a balance beam pivotally mounted on said bracket, a scale pan pivotally connected with one end of said beam and having a mold adjustable for various can sizes for centering a can on said scale pan so that the center of gravity of the suspended weight of can and scale pan falls in a line directly under the point of connection between the said scale pan and said beam, means associated with said beam for balancing a normal weight can in the said can mold of said scale pan, and means carried by said scale pan and disposed above said balance beam for supporting scale weights to compensate for cans of less than the maximum normal weight for which the scale unit is adjusted.

6. A scale unit for a can weighing machine comprising, in combination, a support bracket, a balance beam pivotally mounted on said bracket, a scale pan pivotally connected with one end of said beam and having a mold adjustable for various can sizes for centering a can on said scale pan so that the center of gravity of the suspended weight of can and scale pan falls in a line directly under the point of connection between the said scale pan and said beam, a counterweight having a shiftable center of gravity mounted above the said balance beam and secured on the opposite side of its pivotal mounting from said scale pan for effecting the weighing of a can in said scale pan and means carried by said scale pan and disposed above said balance beam for supporting scale weights to compensate for cans of less than the maximum normal weight for which the scale unit is adjusted.

7. A scale unit for a can weighing machine comprising, in combination, a support bracket, a balance beam pivotally mounted on said bracket, a scale pan pivotally connected with one end of said beam and having a can mold for centering a can on said scale pan so that the center of gravity of the suspended weight of can and scale pan falls in a line directly under the point of connection between the said scale pan and said beam, means associated with said beam for balancing a normal weight can in the said can mold of said scale pan, and a vertically disposed weight holder carried by said scale pan above said beam by means of which supplemental weights are held to adapt the said scale unit for the weighting of a different normal weight can.

8. A scale unit for a can weighing machine comprising, in combination, a support bracket, a balance beam pivotally mounted on said bracket, a scale pan pivotally connected with one end of said beam and adapted to receive a can for weighing, a counterweight mounted on the other end of said beam for balancing a normal weight can in said scale pan, and means disposed above said beam in vertical alignment with said scale pan for maintaining constant the total suspended weight of said scale pan and can while adapting the unit for weighing cans having a different normal weight range.

9. In a can weighing machine, the combination of an endless conveyor arranged to follow a straight path and an arcuate path, scale units including scale pans carried by said conveyor and adapted to receive and weigh cans, a discharge table for receiving said cans after weighing, said table having a light, a heavy and a normal can weight section, a distributing mechanism for receiving cans after they are weighed by said scale units and for discharging them on said discharge table, and a detector member actuated in accordance with the weight of a can in a said scale unit, and operating through said distributing mechanism for selectively segregating the cans that are of light, heavy and normal weights on their said corresponding discharge table sections.

10. In a can weighing machine, the combination of an endless conveyor arranged to follow a straight path and an arcuate path, scale units including scale pans carried by said conveyor and adapted to receive and weigh cans, a discharge table for receiving said cans after weighing, said table having a light, a heavy and a normal can weight section, a distributing mechanism for receiving cans after they are weighed by said scale units and for discharging them on said discharge table, a detector trip element set, in accordance with the weight of a can in a said scale unit, into one of three positions corresponding to the said discharge table sections, and means actuated by said trip element and operating through said distributing mechanism for segregating the cans as discharged so that light, heavy and normal weight cans are selectively grouped on said table sections.

11. In a can weighing machine, the combination of an endless conveyor arranged to follow a straight path and an arcuate path, scale units including scale pans carried by said conveyor and adapted to receive and weigh cans, a discharge table for receiving said cans after weighing, said table having a light, a heavy and a normal can weight section, a distributing mechanism for receiving cans after they are weighed by said scale units and for discharging them on said discharge table, a detector trip element set, in accordance with the weight of a can in a said scale unit, into one of three positions corresponding to the said discharge table sections, a normal can shift member connected with said distributing mechanism and movable by said trip element when set in its normal can position for discharging the said normal can into its discharge table section, and a second or heavy weight can shift member also connected with said distributing mechanism and movable by said trip element when set in its heavy can position for discharging the said heavy can into its discharge table section.

12. In a can weighing machine, the combination of an endless conveyor arranged to follow a straight path and an arcuate path, scale units including scale pans carried by said conveyor and adapted to receive and weigh cans as light, heavy and normal weight, a discharge table having a light, heavy and normal weight can receiving section for receiving said weighed cans, means actuated in accordance with the weights of the individual cans as determined by their associated scale units for discharging and segregating by weight the weighed cans upon said table sections, and a plurality of interlocked balance gates for controlling the movement of a said scale unit when weighing an overweight can to prevent violent weighing action, said gates being movable in proportion to the amount of overweight in the can.

13. In a can weighing machine, the combination of an endless conveyor, scale units carried by said conveyor and adapted to receive and weigh cans, a revoluble turret for receiving said cans after weighing, a discharge table divided into a light, a heavy and a normal can weight section, and means carried by said turret for selectively distributing all cans after weighing from said turret into the said table sections, the selection of a discharge table section by said distributing means being made in accordance with the weighing position of a said scale unit which position is in turn determined by the individual weight of the can.

14. In a can weighing machine, the combination of an endless conveyor, scale units each including a scale beam carried by said conveyor and adapted to receive and weigh cans, means for holding said scale units against vertical movement except when weighing, a discharge table for receiving said weighed cans, detector mechanism disposed in the path of and operable by said scale beam in accordance with the weights of individual cans carried by the scale units, and means actuated by said detector mechanism for discharging and segregating by weight weighed cans upon said table.

15. In a can weighing machine, the combination of an endless conveyor, scale units each including a scale beam carried by said conveyor and adapted to receive and weigh cans, feeding devices for bringing cans into the machine and for positioning an individual can into a said scale unit, means for holding said scale units against vertical movement except when weighing, a discharge table for receiving said weighed cans, detector mechanism disposed in the path of and operable by said scale beam in accordance with the weights of individual cans carried by the scale units, and means actuated by said detector mechanism for discharging and segregating by weight the weighed cans upon said table.

16. In a can weighing machine, the combination of an endless conveyor, scale units each including a scale beam carried by said conveyor and adapted to receive and weigh cans, feeding devices for bringing cans into the machine on a predetermined level and for positioning an individual can into a said scale unit at the same level, means for holding said scale units against vertical movement and at said predetermined level except when weighing, a discharge table located at said level for receiving said weighed cans, detector mechanism disposed in the path of and operable by said scale beam in accordance with the weights of said individual cans carried by the scale units, and means actuated by said detector mechanism for discharging and segregating by weight the weighed cans upon said table.

17. In a can weighing machine, the combination of an endless conveyor so arranged as to follow an arcuate path and a straight path, scale units each including a scale beam carried by said conveyor and adapted to receive and weigh cans, a detector member adapted to move in unison with a said scale unit and to be actuated while carried along the said conveyor's arcuate path, means disposed in the path of and actuated by a said scale beam positioned by its can during the weighing operation for setting an element of said detector member in accordance with the can weight, a discharge table for receiving said weighed cans, and means actuated by said set element of the detector member for discharging and segregating by weight the weighed cans upon said table.

18. In a can weighing machine, the combination of an endless conveyor, scale units each including a scale beam carried by said conveyor and adapted to receive and weigh cans, a discharge table for receiving said cans after weighing, a light, a heavy and a normal can weight conveyor located on said discharge table, detector mechanism disposed in the path of and operable by said scale beam in accordance with the weights of individual cans carried by the scale units, and means actuated by said detector mechanism for selectively placing the can in the proper light, heavy or normal can weight conveyor as it is brought onto the said discharge table.

19. In a can weighing machine, the combination of a plurality of scale units each including a scale beam adapted to receive and weigh cans, means for pivotally connecting adjacent scale units to provide an endless conveyor so arranged as to follow an arcuate path and a straight path, actuating means for moving said conveyor to carry each scale unit through a weighing station, detector mechanism disposed in the path of and operable by a said scale beam in accordance with the weights of individual cans carried by the scale unit, and means actuated by said detector mechanism in accordance with the weighing position of a said scale unit in said weighing station for discharging each weighed can in its proper weight class, said discharge means operating to discharge each weighed can during the travel thereof along the arcuate path of said endless conveyor.

WILLIAM ROSS SMITH.